United States Patent [19]

Koyama et al.

[11] Patent Number: 4,849,782
[45] Date of Patent: Jul. 18, 1989

[54] FOCUS DETECTING DEVICE

[75] Inventors: Takeshi Koyama; Keiji Ohtaka, both of Tokyo, Japan

[73] Assignee: Canon Kabushiki Kaisha, Tokyo, Japan

[21] Appl. No.: 877,850

[22] Filed: Jun. 24, 1986

[30] Foreign Application Priority Data

Jun. 28, 1985 [JP] Japan ................................. 60-143126
Oct. 2, 1985 [JP] Japan ................................. 60-220588

[51] Int. Cl.⁴ .............................................. G03B 3/00
[52] U.S. Cl. ..................................... 354/408; 250/204
[58] Field of Search ............... 354/406, 407, 408, 402; 250/201 PF, 204

[56] References Cited

U.S. PATENT DOCUMENTS

| | | | |
|---|---|---|---|
| 3,682,071 | 8/1972 | Hosoe | 354/406 X |
| 4,132,888 | 1/1979 | Kondo | 354/406 X |
| 4,220,406 | 9/1980 | Schaefer | 354/407 |
| 4,230,401 | 10/1980 | Tokutomi et al. | 354/406 |
| 4,497,561 | 2/1985 | Suzuki | 354/406 |
| 4,526,458 | 7/1985 | Kawamura et al. | 354/406 |
| 4,561,570 | 12/1985 | Matsumura | 354/406 |
| 4,563,576 | 1/1986 | Matsumura et al. | 354/406 X |
| 4,573,784 | 3/1986 | Suzuki | 354/406 |
| 4,659,917 | 4/1987 | Suzuki et al. | 354/407 X |
| 4,712,901 | 12/1987 | Ohtaka et al. | 354/408 X |

Primary Examiner—W. B. Perkey
Attorney, Agent, or Firm—Fitzpatrick, Cella, Harper & Scinto

[57] ABSTRACT

A focus detecting device having a field lens disposed near the predetermined imaging plane of an objective and a secondary imaging optical system disposed rearwardly of the field lens, whereby a pair of object images based on light beams passing through different portions of the pupil of the objective are formed and the respective object images are detected by photoelectric conversion element rows disposed rearwardly of the secondary imaging optical system to thereby discriminate the focus state of the objective from the amount of relative deviation of the object images is characterized in that a refracting portion for refracting the light beam in the direction of arrangement of the photoelectric conversion elements is provided in the secondary imaging optical system.

10 Claims, 5 Drawing Sheets

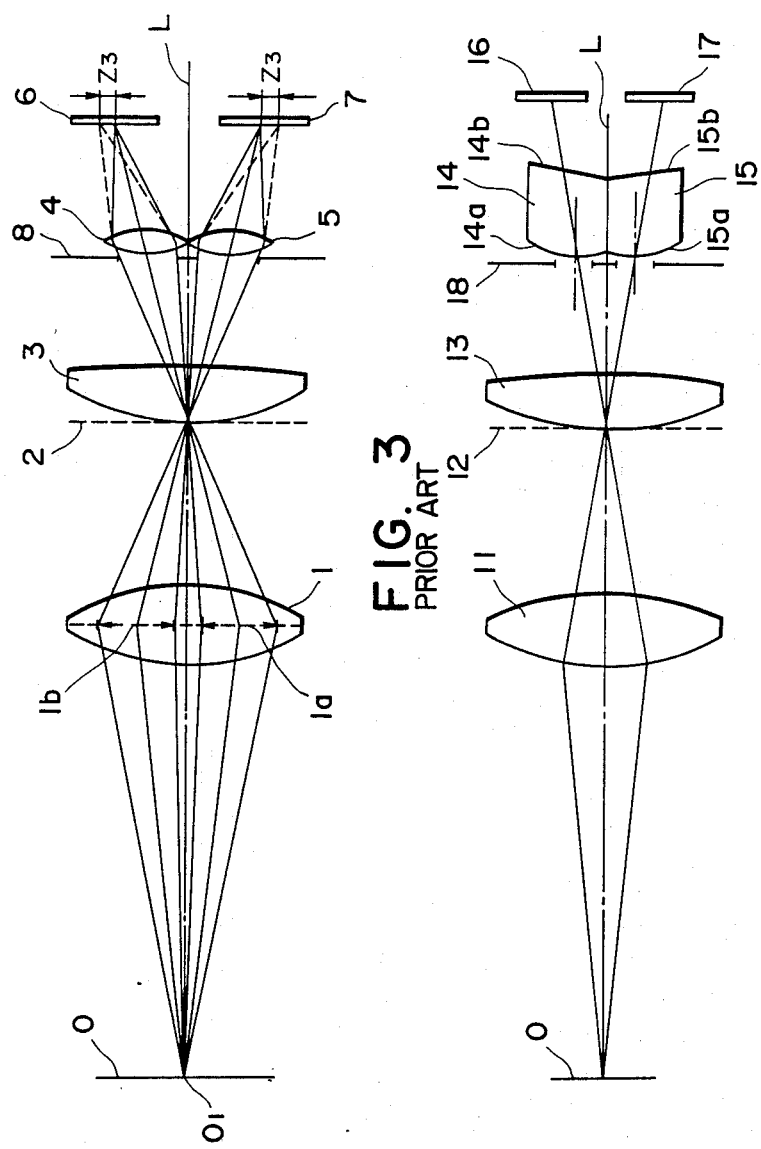

FOCUS DETECTING DEVICE

BACKGROUND OF THE INVENTION

1. Field of the Invention

This invention relates to a focus detecting device for discriminating the state of focus adjustment from the amount of deviation between two object images in one direction formed by an optical system.

2. Description of the Prior Art

In single lens reflex cameras or the like, the so-called image deviation type focus detecting device designed to form two object images on the basis of light beams from two different portions of the pupil of the photo-taking lens and detect the focus state of the photo-taking lens from the relative positional relation between the object images is well known, for example, from U.S. Pat. No. 4,497,561.

FIG. 1 of the accompanying drawings shows an example of such image deviation type focus detecting device. In this FIG. O designates the surface of an object to be photographed, reference numeral 1 denotes a photo-taking lens in a single lens reflex camera, not shown, reference numeral 3 designates a field lens provided near the predetermined imaging plane 2 of the photo-taking lens 1 (the focal plane in the camera), reference numerals 4 and 5 denote secondary imaging lenses disposed symmetrically about the optical axis L of the photo-taking lens 1 for imaging two object images on the basis of light beams passing through different portions 1a and 1b of the pupil of the photo-taking lens 1, and reference numerals 6 and 7 designate photoelectric conversion element rows for detecting the object images imaged by the secondary imaging lenses 4 and 5. The element rows 6 and 7 are comprised, for example, of CCD (charge coupled device) or the like. The light-receiving surfaces of the element rows 6 and 7 are disposed on or forwardly or rearwardly of a plane conjugate with the predetermined imaging plane 2. Reference numeral 8 designates a mask provided near the secondary imaging lenses. The field lens 3 images the opening portions 8a and 8b of the mask 8 on the different portions 1a and 1b of the pupil of the photo-taking lens 1. In such a device, when the photo-taking lens 1 is moved leftwardly as viewed in FIG. 1 to bring about the so-called front focus state, the object images on the surface of the object to be photographed imaged on the light receiving surfaces of the respective photoelectric conversion element rows 6 and 7 by the secondary imaging lenses 4 and 5 become deviated in the directions of arrows and thus, the front focus state and the amount thereof are detected by the variation in the output of the photoelectric conversion element rows 6 and 7 corresponding to the relative deviation of said images. Also, in the case of the rear focus state, the respective images become deviated in the directions opposite to the case of the front focus state and therefore, the rear focus state and the amount thereof are detected.

SUMMARY OF THE INVENTION

It is an object of the present invention to improve the focus detection accuracy.

It is another object of the present invention to alleviate the distortion created in the image of an object.

BRIEF DESCRIPTION OF THE DRAWINGS

FIGS. 2 and 3 illustrate the problems peculiar to the prior art.

FIG. 4 is an optical cross-sectional view showing a first embodiment of the present invention.

DESCRIPTION OF THE PREFERRED EMBODIMENTS

Figure 2:
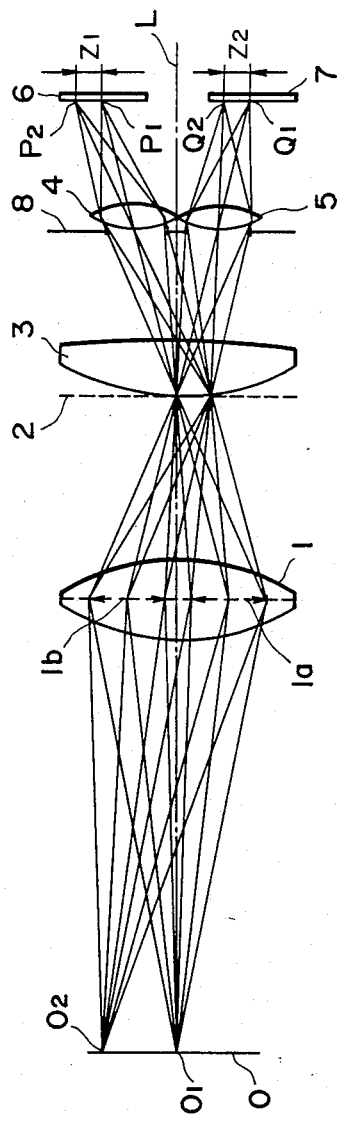

One of causes reducing the distance measuring accuracy which depends on the angle of view will hereinafter be described with reference to FIG. 2. In FIG. 2, members are similar to those previously described and on the other hand, the point of intersection between the optical axis L and the surface O of an object to be photographed is O1 and an off-axis point is O2. A light beam emitted from the point O1 is imaged on photoelectric conversion element rows 6 and 7 by the action of secondary imaging lenses 4 and 5, and the points at which the light beam is imaged are P1 and Q1.

Considering now the light beam emitted from the off-axis point O2, this light beam having an angle of view is once imaged on or near a predetermined imaging plane 2, whereafter it is re-imaged on the photoelectric conversion element rows 6 and 7 by the secondary imaging lenses 4 and 5. The points at which this light beam is re-imaged are P2 and Q2. The spacing Z1 between the points P1 and P2 and the spacing Z2 between the points Q1 and Q2 correspond to an image of a length linking the points O1 and O2 together and must therefore be equal to each other, but it has been found that they are not equal to each other depending on the aberrations of the secondary imaging lens. It is therefore conceived that even in the case of an object of a uniform object distance, the inconvenience that discrimination of the focus state of the lens differs between the central area and the marginal area of the distance measuring field of view occurs. Thus, the accuracy is reduced because signal processing is effected while including the incoincidence between the central area and the marginal area.

Apart from what has been described above, where the chromatic aberration of the secondary imaging lens is not well corrected, it is conceived that the imaged position differs depending on wavelength and a difference Z3 occurs. Therefore, discrimination of the focus state of the lens differs depending on the hue of the object to be photographed, and this may cause a reduction in focusing accuracy.

The focus detecting device according to the present invention is provided with a refractive portion like a prism which, when the image of an objective is to be further re-imaged by the secondary imaging optical system, forms the object images on photoelectric converting means by light beams passing through different portions of the pupil of the objective and through which particularly the secondary imaging optical system refracts the light beams in the image scanning direction of the photoelectric converting means (which scanning direction is not concerned with the order of scanning). In an embodiment which will be described later, the acting surface of the prism is a flat surface inclined with respect to the direction of arrangement of the photoelectric conversion element rows, but instead of the flat surface being inclined, use may be made of an optical block which is apparently a parallel plate but has a distribution of refractive index therein.

FIG. 4 shows a first embodiment of the present invention. O designates the surface of an object to be photographed, reference numeral 11 denotes, for example, the photo-taking lens of a single lens reflex camera, reference numeral 12 designates the predetermined imaging plane of the photo-taking lens, and reference numeral 13 denotes a field lens disposed on or near the predetermined imaging plane with its optical axis L being coincident with the optical axis of the photo-taking lens. Reference numerals 14 and 15 designate secondary imaging lenses which are in the form of lenses having the sides thereof cut away and joined together and which are integrally formed of plastics. The front surfaces of the secondary imaging lenses 14 and 15 are spherical surfaces 14a and 15a and the rear surfaces thereof are inclined flat surfaces 14b and 15b which form a valley shape. The inclinations of the rear flat surfaces are determined to a direction parallel to the direction of arrangement (the image scanning direction) of the elements of photoelectric conversion element rows 16 and 17. In the present embodiment, the element rows are two serial rows, but alternatively, the photoelectric conversion element rows may be two areas of a single element row.

Reference numeral 18 designates a two-aperture mask disposed just forwardly of the secondary imaging lenses 14 and 15, and the centers of the openings of the two-aperture mask 18 are coincident with the optical axes of the secondary imaging lenses 14 and 15, respectively.

The inclined flat surfaces 14b and 15b are symmetrical with respect to the optical axis L, and this angle is determined by the following method.

Figure 5:
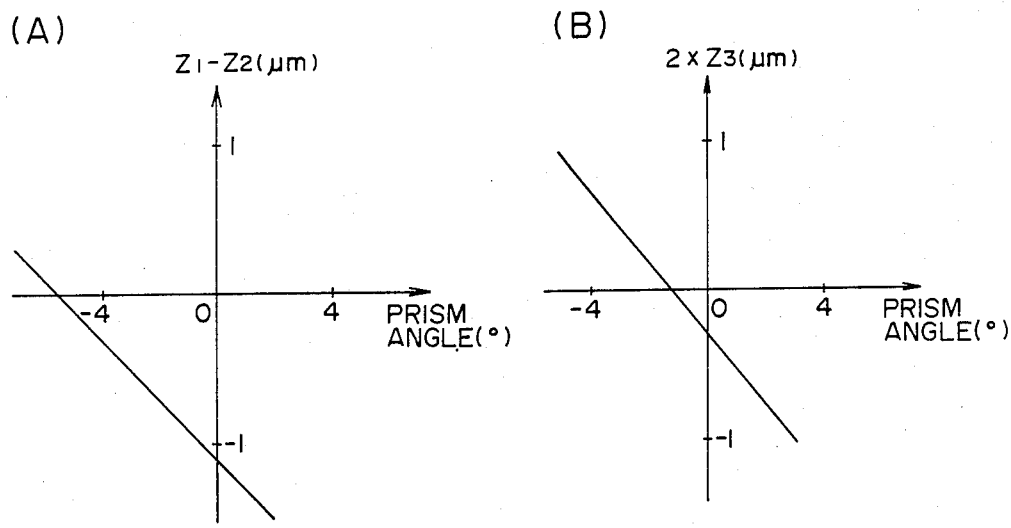
FIG. 5 illustrates the relation between the prism angle and the subject of correction.

FIG. 5(A) is a graph in which the abscissa represents the prism angle and the ordinate represents the difference Z1−Z2 between the imaging positions, and FIG. 5(B) is a graph in which the abscissa represents the prism angle and the ordinate represents the difference 2Z3 between the imaging positions by wavelength. The direction in which the prism angle is rendered negative is the direction in which various amounts to be eliminated are positive. Also, the sensitivity to variation is higher as the secondary imaging lenses are shorter. FIGS. 5(A) and (B) are ones when the focal length of the secondary imaging lenses is standardized to f=1 and the length thereof is selected to 1.046.

As can be seen from these graphs, there is a prism angle which renders Z1−Z2 zero and a prism angle which renders 2Z3 zero, but the values of these two prism angles are not coincident with each other and therefore, for example, a mean value attaching weight to the elimination of the difference Z1−Z2 may be adopted.

An example of the numerical values of the secondary imaging lenses shown in FIG. 4 is as follows. In Table 1 below, R1 corresponds to 14a and 15a and R2 corresponds to 14b and 15b. R represents the radius of curvature, D represents the thickness of the lens, Nd represents the refractive index for d-line, and $\nu d$ represents the able number.

TABLE 1

| | R | D | Nd | $\nu d$ |
|---|---|---|---|---|
| 1 | 0.4917 | 1.046 | 1.49171 | 57.4 |
| 2 | ∞* | | | |

Figure 1:
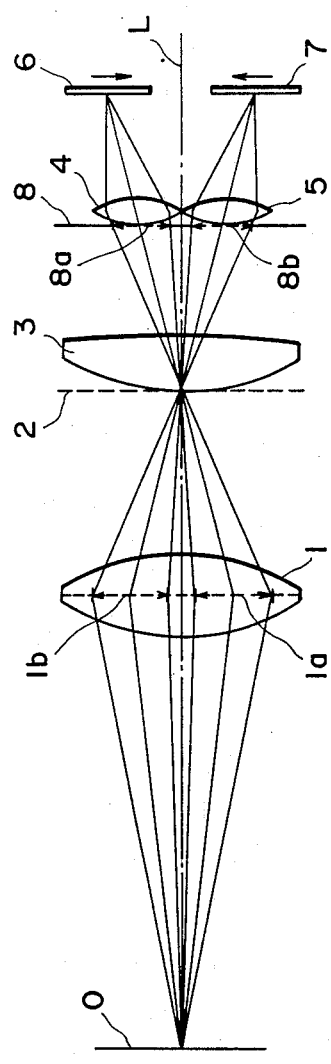
FIG. 1 is an optical cross-sectional view showing an example of the prior art.

*The flat surfaces R2 are each inclined at 4° so as to form a valley shape (FIG. 1).

The spacing between the centers of the openings of the mask 18 and the spacing between the centers of the two optic axes of the secondary imaging lenses 14 and 15 are both 0.247. The material of the secondary imaging lenses is acryl and the imaging magnification thereof is 0.35.

By the above-described construction, Z1−Z2 and Z have been suppressed to Z1−Z2=−0.32 μm (corresponding to the height of 2 mm on the predetermined imaging plane) and Z=+0.63 μm (the difference between d-line and g-line), respectively.

Next, in designing the optical system, it is desirable for the secondary imaging lens provided with a prism acting surface to take the following conditions into consideration:

$$f/3 < d < N \cdot f \cdot (\beta + 1) \tag{1}$$

$$2° < |\theta| < 10° \tag{2}$$

where d is the thickness of the secondary imaging lens (the length along the optical axis), f is the focal length thereof, N is the refractive index of the medium, $\beta$ is the absolute value of the imaging magnification, and $\theta$ is the angle formed by the prism surface with respect to a plane perpendicular to the optic axis (the prism angle).

The meaning of the external values of conditions (1) and (2) above will now be described.

Condition (1) prescribes the thickness of the secondary imaging lens and the upper limit thereof is set to cause the secondary imaging plane to exist rearwardly of the secondary imaging lens. Also, if the thickness d is made small beyond the lower limit of this condition and the lens acting surface comes close to the prism acting surface, the point of intersection between the two straight lines to be described will become more distant from the origin and it will become impossible to correct the various amounts Z1−Z2 and Z3 of which the problems have been previously pointed out.

On the other hand, condition (2) prescribes the prism angle $\theta$ and, if the lower limit thereof is exceeded, the correction effect of the various amounts cannot be displayed sufficiently. Also, if the upper limit of this condition is exceeded, when attention is paid to a certain point in the distance measuring field of view on the primary imaging plane, it will become difficult for the shapes of two spots on the secondary imaging plane corresponding to this point which have been affected by aberrations to be made identical to each other.

Figure 6:
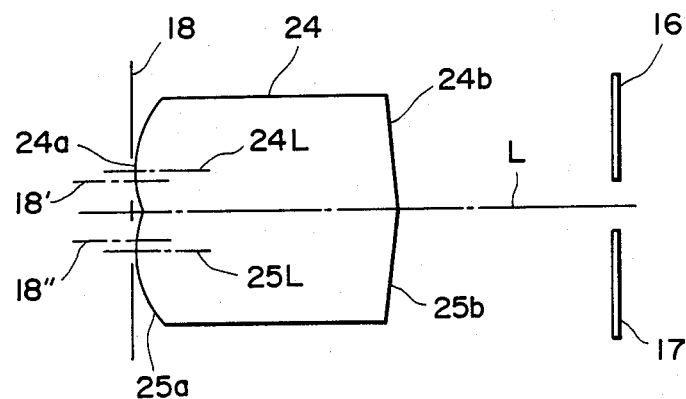
FIG. 6 is an optical cross-sectional view of the essential portions of a second embodiment of the present invention.

FIG. 6 shows the essential portions of another embodiment of the present invention. In FIG. 6, reference numerals 24 and 25 designate secondary imaging lenses, reference characters 24a and 25a denote the spherical surfaces thereof, and reference characters 24b and 25b designate the inclined flat surfaces thereof which form an angled shape with the optical axis L as the axis of symmetry. The other constituent members are similar to those in the embodiment of FIG. 4, but in the case of the present embodiment, the optical axes 24L and 25L of the secondary imaging lenses are disposed so as to positionally deviate outwardly relative to the centers 18' and 18" of the openings of a two-aperture mask 18. Accordingly, an action similar to that provided by inclining the respective secondary imaging lenses along the arcs of the spherical surfaces 24a and 25a of the lenses can be provided, and this action cooperates with the prism action of the inclined flat surfaces 24b and 25b.

The amount of eccentricity of the secondary imaging lenses and the angle of inclination of the flat surfaces are determined in the following manner.

Figure 7:
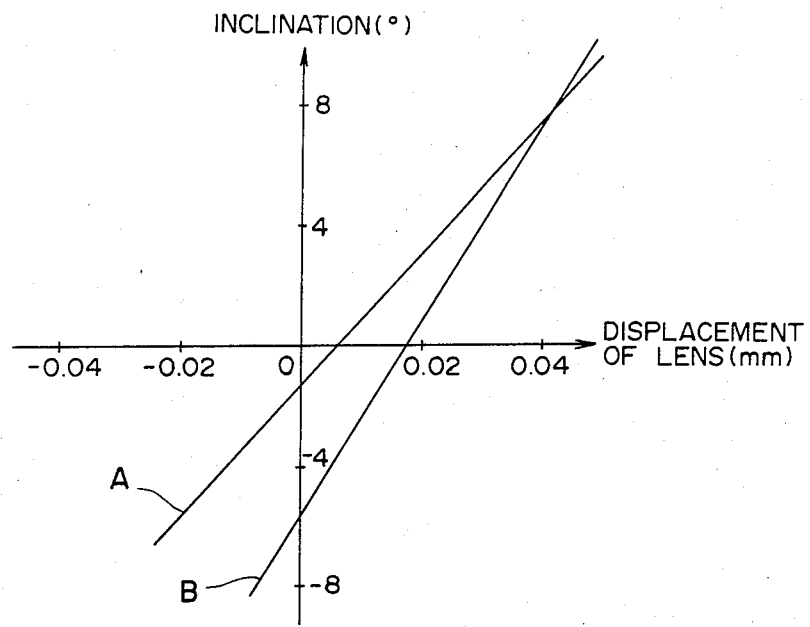
FIG. 7 illustrates the relation among the angle of inclination, the amount of eccentricity and the subject of correction.

In FIG. 7, the ordinate represents the angle of inclination (prism angle) of the flat surfaces, the abscissa represents the amount of eccentricity of the lenses, line A satisfies the condition that Z3=0, and line B satisfies the condition that Z1−Z2=0. The point of intersection between the two lines A and B is the solution, and the numerical data which will be described later is that adopted in the vicinity of this solution. Where the prism angle is gentler than this value or the amount of eccentricity of the lenses is greater than this value, the various amounts to be eliminated become positive, and in the converse case, the various amounts to be eliminated become negative. The solution comes closer to the origin and the tolerance becomes gentler as the length of the secondary imaging lenses becomes greater.

The R, D, Nd, νd, material and imaging magnification of the secondary imaging lenses of FIG. 6 and the spacing between the centers of the two openings of the two-aperture mask 18 are equal to those shown in Table 1, but the spacing between the optical axes of the secondary imaging lenses is 0.322 mm and the flat surfaces 24b and 25b are inclined outwardly by 6° with respect to a plane perpendicular to the optical axes.

Z1−Z2 and Z3 are suppressed to Z1−Z2=−0.084 μm and Z3=+0.042 μm, respectively.

Figure 8:
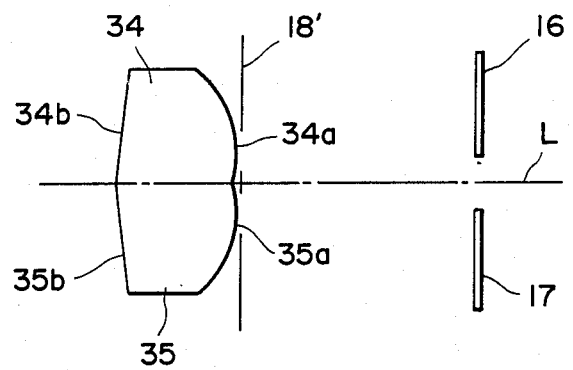
FIGS. 8 and 9 and 10 are optical cross-sectional views of the essential portions of further embodiments of the present invention.

FIG. 8 shows the essential portions of a third embodiment of the present invention. The other portions of this embodiment are similar in construction to those of the FIG. 4 embodiment. In the present embodiment, the flat surfaces (prism surfaces) 34b and 35b and spherical surfaces (converging lens surfaces) 34a and 35b of secondary imaging lenses 24 and 25 are disposed conversely, and a two-aperture mask 18' is provided adjacent to the spherical surfaces 34a and 35a. Thus, the order of the spherical surfaces and flat surfaces are not restricted.

Figure 9:
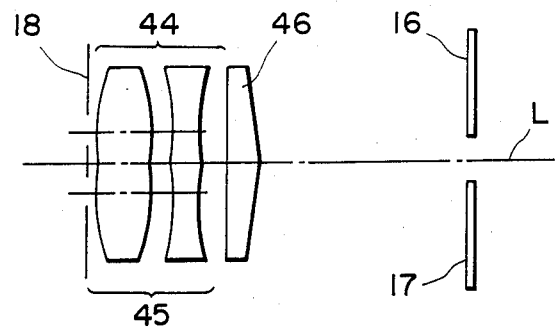

FIG. 9 shows still another embodiment of the present invention. In the above-described embodiments, one end of a bar-like lens has been made into a prism surface, whereas in the present embodiment, a prism acting portion 46 is separated from secondary imaging lenses 44 and 45, and the secondary imaging lenses are comprised of a plurality of single lenses. In the above-described embodiments, both of the secondary imaging lenses are of a shape in which the sides of the lenses are cut away and joined together, and this is a construction for introducing a great quantity of light, and if the quantity of light is sufficient, lenses of a small diameter may be disposed separately from each other.

Figure 10:
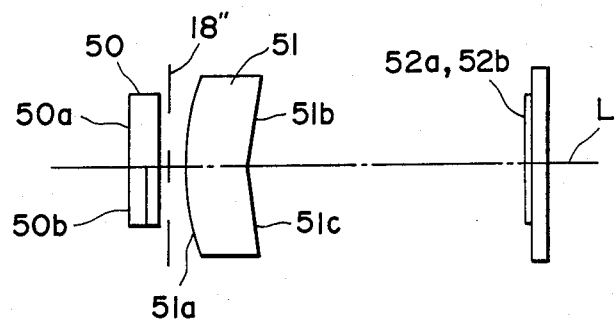
Figure 11:
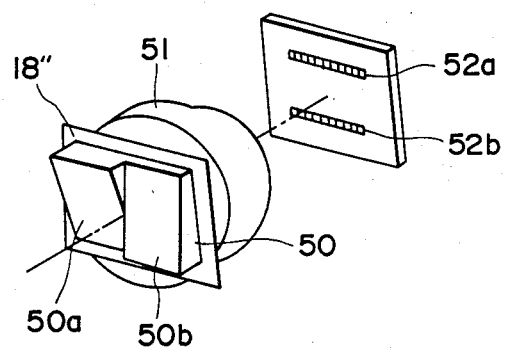
FIG. 11 is a perspective view.

FIG. 10 shows the essential portions of an embodiment in which the present invention is applied to an optical system for separating an image secondary-imaged by a double wedge type prism. FIG. 11 is a perspective view of this embodiment. Reference numeral 50 designates a double wedge type prism comprising image separating prism 50a and 50b, and it is to be understood that as in FIG. 4, there are a photo-taking lens and a field lens at the left of the double wedge type prism 50. Reference numeral 51 denotes a secondary imaging lens disposed with its optical axis being coincident with the optical axis L of the photo-taking lens, not shown. Reference characters 51a and 51b designate the inclined flat surfaces of an equilateral prism which are similar to those described above. These flat surfaces are inclined in directions parallel to the arrangements of photoelectric conversion element rows 52a and 52b. These photoelectric conversion element rows are disposed at positions for receiving the images vertically separated by the action of the double wedge type prism. Again in the case of the present embodiment, the difference Z1−Z2 between the imaging positions and the deviation between the imaging positions by wavelength can be suppressed by the action of the prism surface.

According to the present invention hitherto described, in a device which effects focus discrimation from the positional deviation between a plurality of images, there is the effect that highly accurate detection can always be realized without depending on the object position in the detection field of view or on the hue and by a remarkably simple construction and therefore, the device need not be made bulky and further, the problems can be solved in the optical system and thus, the burden of the electrical processing system can be lightened.

We claim:
1. A device for detecting the state of focus adjustment of an objective, comprising:
    a field lens disposed in proximity to a prospective imaging plane of said objective;
    a plural-image forming optical system for forming a plurality of object images of varying relative positional relation from a light beam having passed through the objective, said plural-image forming optical system comprising a plurality of lenses each generating one of said object images;
    a sensor for producing a signal relating to the positional relation between said plurality of object images to discriminate the state of focus adjustment and for receiving the light beam forming said plurality of object images; and
    a refractor for refracting the light beam forming said plurality of object images only in the scanning direction of said sensor, said refractor being disposed apart from said field lens.

2. A device according to claim 1, wherein said plural-image forming optical system is imaging lenses having optical axes parallel to each other, and said refracting means is a prism provided at an end of each of said imaging lenses and having flat planes inclined symmetrically to each other.

3. A device according to claim 2, wherein said imaging lenses are a single lens.

4. A device according to claim 2, wherein said imaging lenses comprise a plurality of single lenses.

5. A device according to claim 1, wherein said plural-image forming optical system is imaging single lenses having optical axes parallel to each other, said refracting means is a prism provided at an end of each of said imaging single lenses and having flat planes inclined symmetrically to each other, and the following conditions are satisfied:

$$f/3 < d < N\cdot f\cdot(\beta+1)$$

$$2° < |\theta| < 10°$$

where f, d, N, $\beta$ and $\theta$ are the focal length of the imaging single lens, the thickness of the imaging single lens along the optical axis thereof, the refractive index of the imaging single lens, the absolute value of the imaging lens, the absolute value of the imaging magnification of the imaging single lens, and the angle of inclination of the inclined surfaces with respect to a plane perpendicular to the optical axis, respectively.

6. A device for detecting the state of focus adjustment of an objective, comprising:

a field lens disposed on or near the predetermined imaging plane of the objective;

a pair of imaging single lenses disposed rearwardly of said field lens and forming object images of varying relative positional relation; and a plurality of photosensors for producing a signal relating to the positional relation between the object images to discriminate the state of focus adjustment and for receiving a light pattern relating to said object images;

one end of each of said imaging single lenses being spherical and the other end thereof being an inclined plane which refracts light in the direction of the arrangement of said plurality of photosensors.

7. A device according to claim 6, further comprising a mask having apertures corresponding to said imaging single lenses, respectively.

8. A device according to claim 7, wherein the optical axis positions of said imaging single lenses and the centers of said apertures are offset with respect to each other.

9. A device according to claim 6, wherein the refracting surfaces of said pair of imaging single lenses form a valley shape.

10. A device according to claim 6, wherein the refracting surfaces of said pair of imaging single lenses form a mountain shape, and wherein the following conditions are satisfied:

$$f/3 < d < N\cdot f\cdot(\beta+1)$$

$$2° < |\theta| < 10°$$

where f, d, N, $\beta$ and $\theta$ are the focal length of the imaging single lens, the thickness of the imaging single lens along the optical axis thereof, the refractive index of the imaging single lens, the absolute value of the imaging magnification of the imaging single lens, and the angle of inclination of the refracting surfaces with respect to a plane perpendicular to the optical axis, respectively.

* * * * *

UNITED STATES PATENT AND TRADEMARK OFFICE
CERTIFICATE OF CORRECTION

PATENT NO. : 4,849,782

DATED : July 18, 1989

INVENTOR(S) : Koyama et al.

It is certified that error appears in the above-identified patent and that said Letters Patent is hereby corrected as shown below:

COLUMN 1
  Line 22, change "FIG. O" to --FIG., O--.

COLUMN 4
  Line 4, change "able number." to --Abbe number.--.

COLUMN 5
  Line 45, change "34a and 35b" or --34a and 35a--.

COLUMN 6
  Line 21, change "discrimation" to --discrimination--.

Signed and Sealed this

Twenty-sixth Day of June, 1990

Attest:

HARRY F. MANBECK, JR.

*Attesting Officer*  *Commissioner of Patents and Trademarks*